3,176,843
SCREEN TENSIONER
Robert J. Hoskins, Guilford, Conn., and Walter R. Hoover, Wilmington, Del., assignors to Entoleter, Inc., New Haven, Conn., a corporation of Delaware
Filed Jan. 9, 1962, Ser. No. 165,084
4 Claims. (Cl. 209—403)

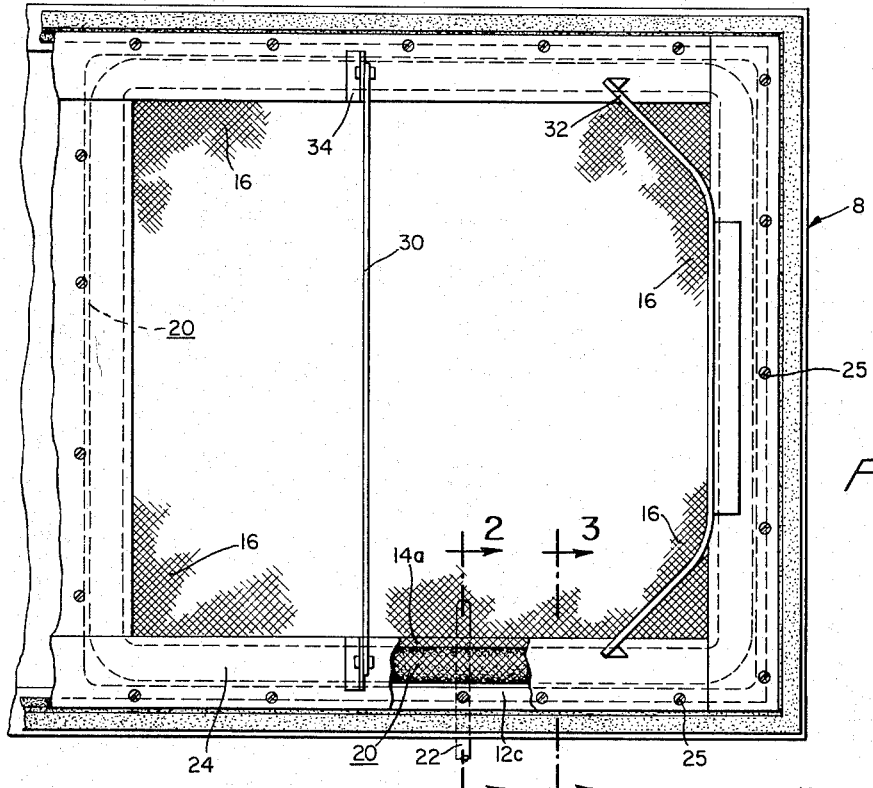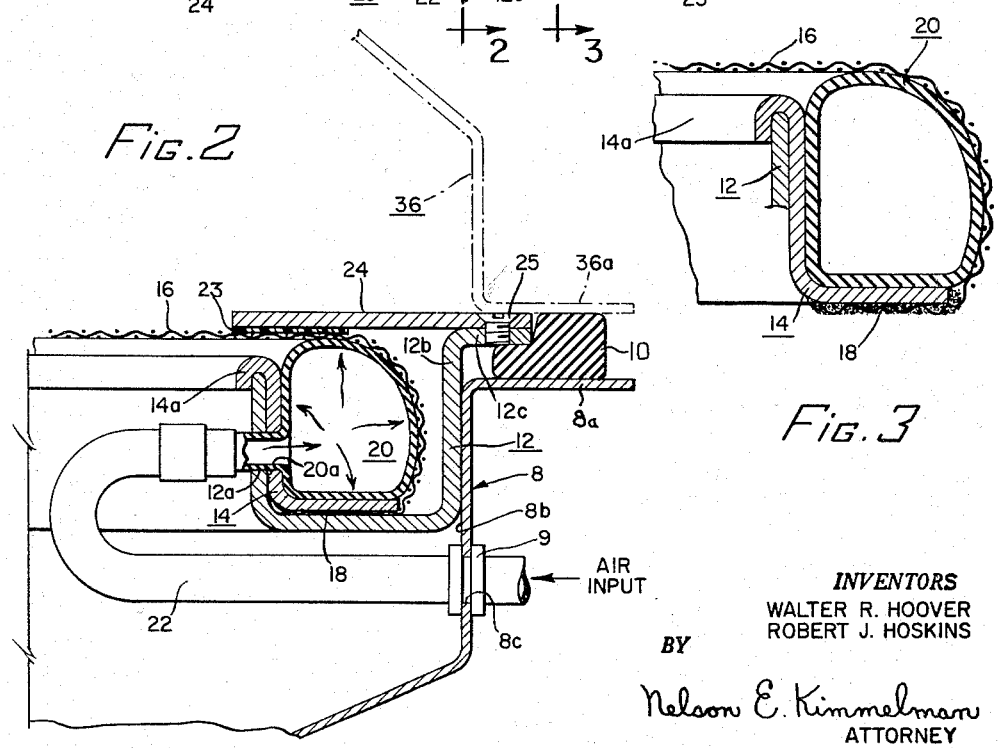

This invention relates to tensioning apparatus and in particular to a pneumatic device and system for tensioning screen material or the like used in sifting apparatus.

There are many industrial and commercial applications for sifting apparatus which is durable, capable of handling large quantities of siftable material, has a screening material which is constructed and arranged to be resistant to clogging of its openings, capable of imparting substantial movement to the siftable material in a direction transverse to the plane of the screen, easily cleanable, free from contaminating or adulterating effects upon the material being sifted, and having easily replaceable screens.

For many industrial applications it is desired to use a synthetic and resilient plastic screen such as one made of nylon. The use of nylon screening, however, presents problems because variations in moisture and heat affect its tautness. It is difficult to keep such material taut while it is being attached to the sieve frame and it is also difficult, because of such variations, to maintain the desired tautness while the sifter is in operation. Another aspect of the problems presented by using synthetic screens made of nylon is maintaining the tautness of the screen relatively uniform at all points on the surface of the screen. Still another problem is to mount the screen so that no sharp or abrading edges of objects are present in the vicinity of the screen to weaken or damage the screen material especially since the latter may be subjected during operation to multiple flexions at or near such region.

It is therefore an object of the present invention to provide novel apparatus for tensioning sheet-like materials.

One object of the present invention is to provide a novel screen mounting structure for use with sifting apparatus.

Another object of the invention is to provide a novel system for tensioning screening material in sifting apparatus.

Still another object of the invention is to provide a novel screen mounting and tensioning system which is easily replaceable in the sifting apparatus.

Another aim of the present invention is to provide a novel tensioning system for maintaining the desired tautness of stretchable screening material during operation of sifting apparatus.

A further object of the invention is to provide a novel system for maintaining the tautness of screening material substantially uniform at all points on its surface.

Yet another object of the invention is to provide a novel system for maintaining a desired tautness of resilient screens which are made of plastic materials that are responsive to variations in the ambient atmosphere.

Another object of the invention is to provide a novel tensioning system for screening material in sifters which can be easily adapted for automatic servo-controlled operation to maintain a desired tension.

These and other objects of the invention, which will be apparent to those skilled in the art from a reading of this application, are accomplished in our invention by using pneumatic or hydraulic principles. Specifically, tension is applied to the screening material by means of an elongated, expandable body placed in a channel in contact with the screening material at its periphery. Application of air or other gaseous or fluid matter to the expandable body causes all points on the perimeter of the screening material to be urged outward, the degree of tautness being determined by the pressure applied to the expandable body.

FIGURE 1 is a plan view, partly broken away and partly in phantom, of a sifting apparatus which includes the novel screen tensioner according to one form of our invention;

FIGURE 2 is a sectional view of the apparatus shown in FIG. 1 taken in the direction of the arrows associated with the section line 2—2; and FIGURE 3 is a partial sectional view of the apparatus shown in FIG. 1 taken along the section line 3—3 in the direction indicated.

Referring to FIGURE 1 a mounting frame generally indicated at the numeral 8 is shown which itself is supported by supporting structure (not shown) such as four or more legs. A resilient gasket 10 rests on the horizontal flanged portion 8a (FIG. 2) of the supporting structure 8. A square channel member 12 is disposed inside the supporting structure 8 and is attached by welding or other appropriate methods to the perpendicular surface 8b thereof. Channel member 12 has substantially a U-shaped cross-section and, like member 8, may be made of a rigid material such as stainless steel or other metal.

Disposed within the channel member 12 is a tensioning assembly which consists of a plastic L-shaped cross-sectioned member 14 made of "Fiberglas," for example, or other similar light rigid plastic material. In sifters in which a vertical as well as a horizontal component of motion is imparted to the screen, lightness of the frame reduces the load on the oscillating mechanism. To the lower surface of member 14 a screening material 16, which may be made of nylon, for example, is affixed as by the use of an epoxy adhesive indicated at the numeral 18. The member 14 has a curved lip section 14a which curls over one edge of the U-sectioned member 12 to prevent the former from moving outwardly. Between the member 14 and the screen 16 is disposed an inflatable, elongated member 20 having an inlet portion 20a which extends through an aperture 12a in the member 12. The inflatable member 20 is connected to a source of air or other gaseous phase matter (not shown) by tubing 22 which passes through a grommet 9 in the aperture 8c in the member 8. A number of elongated plates 24 are fixed over the channel members 12 and attached fixedly to the flanged portion 12c thereof by bolts 25 or other suitable fasteners. A strip 23 of a resilient material such as a plastic foam formulation is cemented underneath plates 24 to prevent the screen from being abraded by the plates 24 when the screen flexes. A cover 36 rests on the gasket 10 to keep the sifted material from escaping from the sifter, and its portion 36a may be clamped to the portion 8a of the member 8.

When air is supplied to the tubing 22 from the source the member 20 tends to expand outwardly toward the vertical wall 12b since it is restrained elsewhere by member 14 and plates 24. As it pushes outwardly it increases the tension on the periphery of the screen 16. Since the pressure within the inflatable member 20 is approximately the same at all points along its length, the tension at all points of the perimeter of the screen is maintained substantially uniform.

It will be noted that the screen 16 is curved around the member 20 and is fixed to the bottom of the fiberglass member 14. This method of mounting the screen distributes the pressure of the member 20 to a large area—the area in which the screen 16 bears on the surface of member 20—rather than concentrating the tension along a relatively narrow portion of the screen which might tear the screen or cause unequal tension on it.

The mounting structure 8 has its channel members 12 arranged in a substantially square configuration as shown in FIG. 1. In a typical commercial sifter such as the "Cirlyptic" sifter manufactured by Entoleter, Inc., several of the screens may be mounted side-by-side substantially in the same plane, each screen having a different size mesh for example. There would therefore be a corresponding number of square channels 12 fitted side-by-side within the supporting member 8 and there would be a corresponding number of inflatable members 20 therein. Each of the various members 20 could have separate air supplies or they could all be connected to a common source.

It will be noted that the screen 16 as shown in FIG. 1 is preferably mounted so that its constituent filaments are not disposed perpendicularly to the sides of the channel members 12. This assists in providing equal tensioning of the screen 16. Otherwise, if one set of the screen filaments were mounted in the channels to run at right angles to one pair of opposed parallel sides of one of the channel members 12 and the other set of filaments were mounted at right angles to the other pair of opposed sides, the apertures of the screen might be unequal in size. This is because inflation of the member 20 in one pair of parallel sides would be pulling substantially only on one set of parallel filaments whereas the member 20 in the other pair would be pulling only on the other set of filaments which are perpendicular to the first set.

Shown in FIG. 1 merely to show a typical environment but not constituting part of this invention are baffles 30 and 32. Baffle 30 is placed perpendicular to the screen 16 and is mounted by bolts, for example, to two L-sectioned members 34 which are attached, as by welding, to opposite ones of the members 24. In the aforesaid "Cirlyptic" brand sifter, the entire mounting structure 8 is oscillated both horizontally and vertically so that there is imparted to the siftable material applied to the top of the screen 16 both a vertical component and a horizontal component. The baffles 30 help in separating particles of the material being sifted since they cause the siftable material to dwell on selected ones of the screens 16 for a desired length of time and also because only particles having certain weights and shapes will be able to jump over them. Baffle 32 is an end baffle which prevents the ultimately unsifted material from jumping over the end of the screen area and diverts it to an outlet hole (not shown) whence it is removed.

In the form of the invention illustrated, a single pneumatic tube 20 is shown in all four sides of the square channel member 12 but it should be realized that two or four tubes within channel 12 might prove particularly useful in certain cases. If desired, a conventional pneumatic servo system may be employed to keep the pressure in tube 20 constant.

While the invention has been explained in terms of a resilient plastic screening material, it is apparent that it is also useful when other screening materials such as metal screens are to be used. It is likewise possible to use it whenever a sheet-like material is to be stretched or tensioned. Also, in the embodiment illustrated a gas was used to expand the expandable member, but in some cases a liquid may prove to have utility for this purpose. As many modifications or applications of our invention will occur to those skilled in the art from a reading of this application without departing from the essence of this invention, we desire our invention to be limited only by the claims herein.

We claim:

1. A demountable tensioning assembly for screening material which is adapted to be inserted into receiving channels comprising:
   (a) a rigid member having a cross-section which is substantially L-shaped, said member also having an inwardly and downwardly curving lip for engaging an edge of said channels thereby substantially to prevent movement laterally thereof,
   (b) a tubular inflatable member disposed in contact with said rigid member, and
   (c) screening material curved over and resting upon a surface portion of said inflatable member and having its edges fixedly connected to a lower surface of said L-sectioned member.

2. Apparatus for imparting tension to a sheet-like material comprising:
   (a) inflatable means including a single tubular member disposed in fixed channels near the entire peripheral region of said material,
   (b) said first named means also including a single rigid stationary member to which said material is fixedly connected, said rigid member being disposed in contact with said inflatable member and being fixed positionally within said channels, said rigid member having a substantially L-shaped cross-section and having a curled, inwardly extending upper edge which is constructed to hook over an adjacent wall of said channels thereby to enable it to be demounted therefrom, said material being curved over and resting upon an outer surface portion of said tubular member and being arranged, in response to the application of an inflating medium to said inflatable means, to push said peripheral region of said material outwardly thereby causing said material to become taut.

3. Apparatus for imparting tension to a sheet-like material comprising:
   (a) means including elongated inflatable means disposed in fixed channels near a plurality of edges of said material, said fixed channels having a substantially U-shaped cross-section, said inflatable means comprising a single tubular member over an outer surface portion of which said material curves and rests,
   (b) said first named means also including a selected number of rigid stationary members, each of said rigid members comprising an integral, substantially L-shaped cross-sectioned member having a curved portion at one edge which demountably engages one edge of said channel, said rigid members being disposed in contact with said inflatable means, said material being fixedly connected to a lower surface of said L-shaped member, said tubular member being constructed and arranged in response to the application of an inflating medium thereto to push said edges outwardly thereby causing said material to become taut.

4. A demountable tensioning assembly for sheet-like material, said assembly being adapted to be inserted into a receiving channel, comprising:
   (a) a tubular inflatable member,
   (b) a rigid member in contact with a surface of said channel and also in contact with said inflatable member and having a curved portion that bears upon an edge of said receiving channel thereby substantially to prevent movement of said rigid member in a direction lateral to said channel, said rigid member being releasable from said channel by movement thereof substantially perpendicular to said direction, and (c) sheet-like material curved over and bearing upon a surface portion of said inflatable member, said material having a portion toward its edges fixedly connected to a surface of said rigid member.

References Cited by the Examiner

UNITED STATES PATENTS

| | | | |
|---|---|---|---|
| 662,950 | 12/00 | Long | 209—408 |
| 2,136,950 | 11/38 | Overstrom | 209—403 |
| 2,213,773 | 9/40 | Symons | 209—403 |
| 2,279,042 | 4/42 | Harrington | 209—403 |
| 2,483,088 | 9/49 | De Haven | 254—51 |
| 2,864,500 | 12/58 | Miller | 209—403 |
| 3,081,874 | 3/63 | Corbin | 209—403 |

FOREIGN PATENTS

| | | |
|---|---|---|
| 883,576 | 3/43 | France. |
| 1,036,782 | 8/58 | Germany. |
| 811,054 | 3/59 | Great Britain. |

OTHER REFERENCES

Food Engineering, page 64, April 1961.

HARRY B. THORNTON, *Primary Examiner.*

ROBERT A. O'LEARY, *Examiner.*